3,107,413
ROTARY THREAD CUTTING TOOL

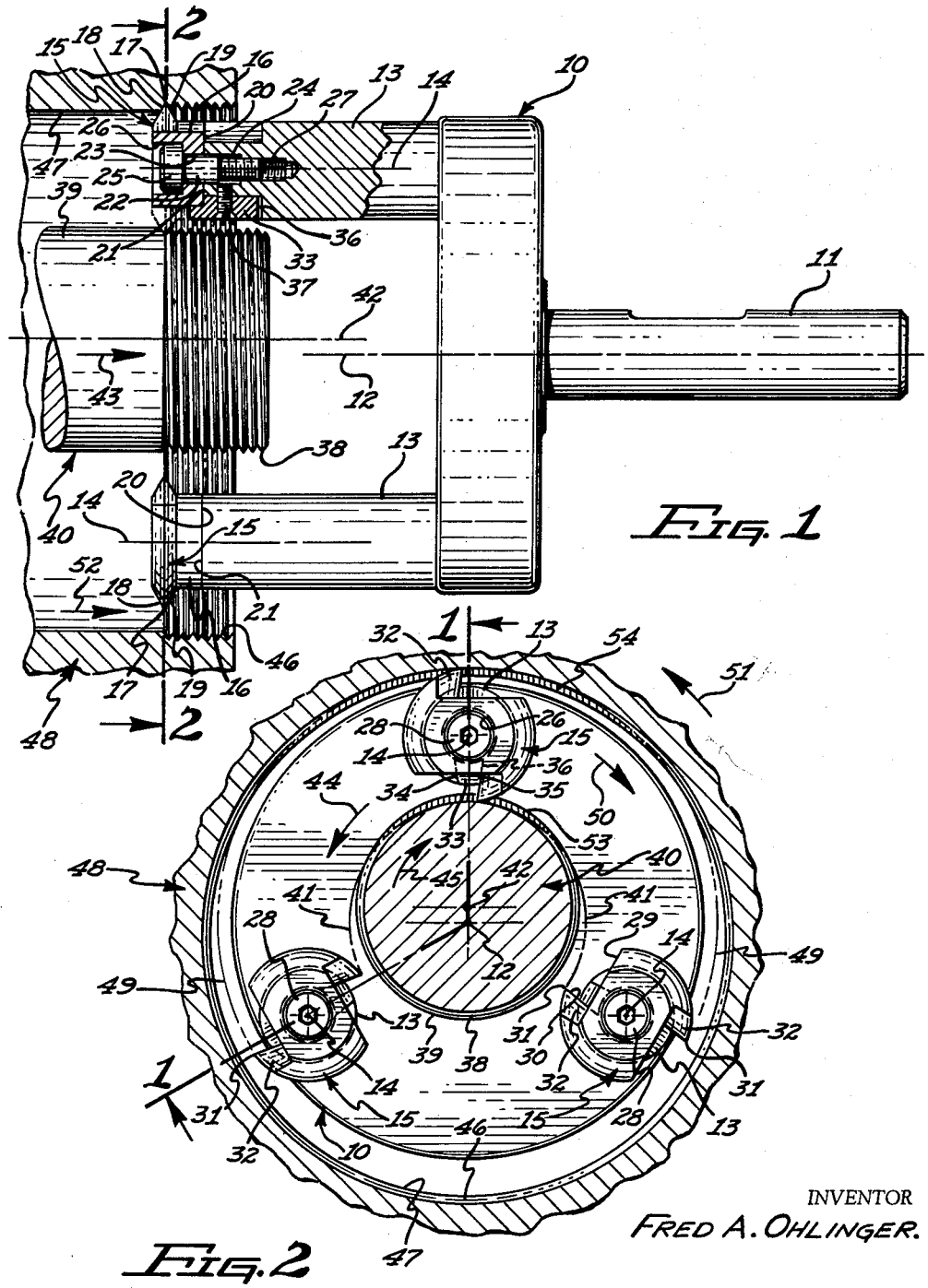

Fred A. Ohlinger, Phoenix, Ariz., assignor to Gear Industries, Inc., Phoenix, Ariz., a corporation of Arizona
Filed June 28, 1961, Ser. No. 120,424
2 Claims. (Cl. 29—105)

This invention pertains to improvements in metal working cutting tools and is particularly directed to a rotary cutting tool particularly adapted to machine threads on rotating circular workpieces.

One of the objects of this invention is to provide a rotary cutter which is extremely efficient in operation and produces a precision surface of high quality finish on the workpiece being machined.

Another object of this invention is to provide a rotary cutting tool having cutting bits that are easily sharpened and replaced without changing the positions setting of the cutting edges of the tool relative to the workpiece.

A further object of this invention is to provide a rotary thread cutting tool for operating on a rotating and axially feeding circular workpiece which produces a highly finished and accurate thread thereon.

It is a further object of this invention to provide a rotary thread cutting tool having a plurality of circumferentially spaced demountable cutting bits each arranged to be sharpened and replaced while at all times maintaining the precise position of the cutting edges of the bits to the workpiece being threaded.

And a further object is to provide a rotary thread cutting tool adapted to cutting internal and external threads on a circular workpiece with equal facility.

Further features and advantages of this invention will appear from a detailed description of the drawings in which:

FIG. 1 is a side elevation of a rotary thread cutting tool incorporating the features of this invention, partly in section on the line 1—1 of FIG. 2.

FIG. 2 is an end elevation of the rotary cutter and workpiece, partly in section on the line 2—2 of FIG. 1.

As an example of one embodiment of this invention there is shown a rotary thread cutting tool having the body 10 to which is fixed the shank 11 adapted to be gripped in the spindle of a suitable machine tool for rotation about the tool rotation axis 12. Fixed to the body 10 and extending axially outwardly therefrom are the tool bit support posts 13 spaced circumferentially about the body 10 with the axes 14 of the posts equally radially distant from the axis of rotation 12 of the body 10 of the rotary cutter.

Mounted on the outer ends of the support posts 13 are the cutters 15 each comprising a hub 16 and a cutting edge diameter 17 formed by the bevelled side faces 18 and 19 forming the sides of the threads to be cut on the workpiece. The outer end of the hub portion 16 terminates in the end abutment surface 20 which abuts against the outer end 21 of the post 13. A clamp screw 28 having a cylindrical shoulder portion 22 closely fitting in the bore 23 also closely fits in the bore 24 formed in the outer end of the post 13, the bore 24 being coaxial with the axis 14 of the post 13. The clamp screw has the head 25 contained in the usual clearance counter bore 26 and its inner reduced threaded end is received in the smaller threaded bore 27 in the post 13, so that tightening of the clamp screws locks the cutters 15 to the posts 13 at the surfaces 20—21.

Each of the cutters 15 have diametrically oppositely disposed cut-away portions in their peripheries formed by the surfaces 29 and 30, the latter surface 30 providing the top rake for the cutting point 31 of the cutters 15. If desired, carbide tips 32 may be inserted in the cutters for greater wear and finish characteristics. To circumferentially position the cutters 15 about the axis 14 of the posts 13, prior to clamping the cutters by the clamp screw 28, so as to position the cutter point 31 properly with respect to the workpiece, there is provided a locating key 33 having bevelled sides 34 and 35 which fit in a mating slot 36 formed in the post 13. The key 33 is held on the post 13 by a suitable screw 37. The cutters 15 are rotated until the top rake surface 30 thereof engages the surface 35 (or 34) of the key to thus properly circumferentially position the cutting point 31 of each cutter 15 to the workpiece.

When external threads 38 are to be machined on the diameter portion 39 of a workpiece 40, the workpiece is presented inside of the path of travel 41 of the inwardly facing cutting points 31 of the cutters 15 as they rotate about the axis 12. The axis of workpiece rotation 42 is offset from the axis of tool rotation 12 as shown particularly in FIG. 2. The workpiece 40 is also fed axially for the required thread lead in the direction indicated by the arrow 43 during the machining operation by apparatus such as shown in application Serial Number 20,745, filed April 7, 1960, and now patent No. 3,072,023, for a rotary table for boring and threading. The tool body 10 rotates rapidly at a proper cutting speed in the direction indicated by the arrow 44 while the work rotates at a relatively slow feeding speed, preferably (but not necessarily) in the direction indicated by the arrow 45.

In machining internal threads 46 in the bore 47 of a workpiece 48, the outwardly facing cutter points 31 traveling in the circular path 49 about the axis 12 in the direction indicated by the arrow 50 are utilized. The work preferably (but not necessarily) rotates in the direction indicated by the arrow 51 while it relatively feeds in the direction indicated by the arrow 52 to produce the proper thread lead. Workpiece 48 rotates at an appropriate relatively slow feeding speed while the tool body resolves at a rapid cutting speed to produce the internal threads.

It will be noted that the rotary thread cutting tool is completely universal in its application to cutting both external and internal threads independently or simultaneously, as shown in FIG. 2. Its high efficiency rapid cutting and fine finish comes from the large areas of cutting arcuate contact 53 and 54 with the workpiece. It will also be noted that the cutters 15 are quickly sharpened and accurately positioned on the tool body as described by minimum maintenance.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A rotary thread cutting tool comprising in combination:
   (a) a body,
   (b) a shank formed on said body adapted to be gripped in the spindle of a machine tool,
   (c) a plurality of tool bit support posts fixed to said body and extending axially outwardly therefrom and spaced circumferentially about said body with the axes of said posts equally radially distant from the axis of rotation of said body on the machine tool spindle, (d) a cutter fixed on the outer end of each of said support posts characterized by,
(e) a hub,
(f) a cutting edge diameter formed by bevelled side faces forming the sides and root of the threads to be cut,
(g) an end abutment surface on the outer end of said hub adapted to abut against the outer end of said support posts,
(h) a clamp screw carried in each of said posts adapted to engage said cutters to lock said cutters rigidly to the ends of said support posts,
(i) each of said cutters being characterized by diametrically oppositely disposed cut-away portions in their peripheries so as to form cutting points lying in radially disposed position relative to the axis of body rotation on opposite sides of each cutter,
(j) and locating key means between said posts and cutters to circumferentially hold said cutters on said posts in said aforementioned radially disposed position of the cutting points for the simultaneous threading of internal and external threads on rotating work pieces.

2. A rotary thread cutting tool adapted to the independent and simultaneous cutting of threads on rotating workpieces comprising in combination:
(a) a body,
(b) means on said body for mounting said body on a tool spindle of a machine tool,
(c) a plurality of circumferentially arranged axially disposed support posts projecting from said body equidistant radially from the axis of rotation of said body,
(d) thread cutters fixed on the ends of each support post,
(e) each cutter having a pair of diametrically disposed cutter points having oppositely facing cutting faces lying substantially in a radially disposed plane passing through said axis of rotation of said body.

References Cited in the file of this patent

UNITED STATES PATENTS

| | | |
|---|---|---|
| 652,643 | Rivett | June 26, 1900 |
| 1,256,637 | Armson | Feb. 19, 1918 |
| 1,415,339 | Hall | May 9, 1922 |